US010059189B2

(12) United States Patent
O'Brien et al.

(10) Patent No.: US 10,059,189 B2
(45) Date of Patent: Aug. 28, 2018

(54) ELECTRIC MACHINE WITH VARIABLE TORQUE DRIVE (71) Applicant: Cummins Inc., Columbus, IN (US)

(72) Inventors: John P. O'Brien, Columbus, IN (US); Michael J. Marthaler, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/304,795

(22) PCT Filed: Apr. 24, 2015

(86) PCT No.: PCT/US2015/027597
§ 371 (c)(1),
(2) Date: Oct. 17, 2016

(87) PCT Pub. No.: WO2015/167964
PCT Pub. Date: Nov. 5, 2015

(65) Prior Publication Data
US 2017/0036528 A1 Feb. 9, 2017

Related U.S. Application Data (60) Provisional application No. 61/985,613, filed on Apr. 29, 2014.

(51) Int. Cl.
B60K 6/448 (2007.10)
B60K 6/40 (2007.10)
(Continued)

(52) U.S. Cl.
CPC ............... B60K 6/448 (2013.01); B60K 6/26 (2013.01); B60K 6/36 (2013.01); B60K 6/365 (2013.01);
(Continued)

(58) Field of Classification Search
CPC . B60K 6/26; B60K 6/36; B60K 6/448; H02K 7/116; H02K 7/1815
See application file for complete search history.

(56) References Cited

U.S. PATENT DOCUMENTS 4,439,720 A 3/1984 Georges
4,753,078 A 6/1988 Gardner, Jr.
(Continued)

FOREIGN PATENT DOCUMENTS

GB 0 889 954 2/1962

OTHER PUBLICATIONS

International Search Report and Written Opinion issued in PCT/US2015/027597, dated Sep. 15, 2015.

Primary Examiner — Sean Gugger
(74) Attorney, Agent, or Firm — Foley & Lardner LLP (57) ABSTRACT Electric machine assemblies and methods of manufacturing and operating electric machine assemblies for internal combustion engines are provided. The electric machine assembly includes an electric machine configured to generate electric current by induction via a prime mover causing rotation of one of a rotor and a stator with respect to the other one of the rotor and the stator. The electric machine assembly also includes a torque transmitter including a rotating output driver coupled to the prime mover of the electric machine. The torque transmitter includes a rotating input driver configured to receive a rotary input transmitted from a crankshaft of an internal combustion engine. The rotating input driver is coupled to the rotating output driver to actuate the rotating output driver at a plurality of gear ratios.

21 Claims, 5 Drawing Sheets (51) Int. Cl.

| | |
|---|---|
| B60K 6/442 | (2007.10) |
| B60K 6/54 | (2007.10) |
| B60W 10/06 | (2006.01) |
| B60W 10/08 | (2006.01) |
| B60W 10/11 | (2012.01) |
| B60K 6/26 | (2007.10) |
| B60K 6/36 | (2007.10) |
| B60K 6/365 | (2007.10) |
| B60K 6/543 | (2007.10) |
| B60K 6/547 | (2007.10) |
| B60L 11/12 | (2006.01) |
| B60W 20/30 | (2016.01) |
| F02B 61/06 | (2006.01) |
| F02B 63/04 | (2006.01) |
| F02N 11/00 | (2006.01) |
| F16H 61/02 | (2006.01) |
| H02K 7/116 | (2006.01) |
| H02K 7/18 | (2006.01) |
| H02P 9/06 | (2006.01) |

(52) U.S. Cl.
CPC ............... *B60K 6/40* (2013.01); *B60K 6/442* (2013.01); *B60K 6/54* (2013.01); *B60K 6/543* (2013.01); *B60K 6/547* (2013.01); *B60L 11/12* (2013.01); *B60W 10/06* (2013.01); *B60W 10/08* (2013.01); *B60W 10/11* (2013.01); *B60W 20/30* (2013.01); *F02B 61/06* (2013.01); *F02B 63/042* (2013.01); *F02N 11/00* (2013.01); *F16H 61/0204* (2013.01); *H02K 7/116* (2013.01); *H02K 7/1815* (2013.01); *H02P 9/06* (2013.01); *B60K 2006/268* (2013.01); *B60Y 2200/92* (2013.01); *B60Y 2300/70* (2013.01); *B60Y 2400/60* (2013.01); *B60Y 2400/72* (2013.01); *B60Y 2400/73* (2013.01); *Y02T 10/6234* (2013.01); *Y02T 10/6243* (2013.01); *Y10S 903/905* (2013.01); *Y10S 903/906* (2013.01); *Y10S 903/909* (2013.01); *Y10S 903/91* (2013.01); *Y10S 903/945* (2013.01)

(56) References Cited

U.S. PATENT DOCUMENTS

| | | | | |
|---|---|---|---|---|
| 4,883,973 | A | * | 11/1989 | Lakey ............... F02N 11/04 290/22 |
| 5,637,987 | A | | 6/1997 | Fattic et al. |
| 6,306,057 | B1 | * | 10/2001 | Morisawa ............ B60K 6/365 475/5 |
| 7,334,560 | B2 | | 2/2008 | Clark |
| 7,713,157 | B2 | | 5/2010 | Hastings et al. |
| 2002/0082134 | A1 | | 6/2002 | Hirt et al. |
| 2002/0177504 | A1 | * | 11/2002 | Pels ................... B60K 6/36 477/3 |
| 2004/0145270 | A1 | | 7/2004 | Haydock et al. |
| 2005/0059520 | A1 | * | 3/2005 | Wodeslaysky ......... F16H 3/722 475/59 |
| 2009/0015212 | A1 | * | 1/2009 | Hastings .............. H02K 7/116 322/41 |
| 2009/0017985 | A1 | * | 1/2009 | Choi ................. B60K 6/485 477/68 |
| 2009/0118882 | A1 | | 5/2009 | Heap et al. |
| 2010/0125019 | A1 | * | 5/2010 | Tabata ................. B60K 6/26 477/3 |
| 2013/0080008 | A1 | * | 3/2013 | Tanaka ................ F16H 61/12 701/62 |
| 2013/0328393 | A1 | * | 12/2013 | Bullock ................ B60K 6/46 307/10.1 |
| 2015/0129345 | A1 | * | 5/2015 | Suzuki ................ B60K 6/24 180/292 |
| 2017/0080793 | A1 | * | 3/2017 | Suyama ................ B60K 6/40 |

* cited by examiner

ELECTRIC MACHINE WITH VARIABLE TORQUE DRIVE

CROSS-REFERENCE TO RELATED APPLICATIONS

The present application is a U.S. National Stage Application which claims priority to PCT Application No. PCT/US2015/027597, filed Apr. 24, 2015, which claims the benefit of priority to United States Provisional Patent Application No. 61/985,613, filed Apr. 29, 2014, and the contents of which are incorporated herein by reference in their entirety.

TECHNICAL FIELD

The present disclosure relates to internal combustion engines that are assisted by electric machines.

BACKGROUND

Increased reliance on electrical systems and components may increase the electrical demands of a vehicle. As vehicle electrical demands increase, the capacity of vehicle electrical generation systems with respect to those demands is diminishing. Increasing the capacity of electrical generation systems to meet the increasing electrical demands of the vehicle introduces new inefficiencies, which may adversely impact the performance of the vehicle.

SUMMARY

One embodiment relates to an electric machine assembly. The electric machine assembly includes an electric machine and a torque transmitter. The electric machine is configured to generate an electric current by induction via a prime mover causing rotation of one of a rotor and a stator, relative to each other. The torque transmitter includes a rotating output driver and a rotating input driver. The rotating output driver is coupled to the prime mover of the electric machine. The rotating input driver is configured to receive a rotary input transmitted from a crankshaft of an internal combustion engine. The rotating input driver is also coupled to the rotating output driver to actuate the rotating output driver at a plurality of gear ratios.

Another embodiment relates to an internal combustion engine assembly. The internal combustion engine assembly includes an engine block, an electric machine, and a gearset. The engine block houses a plurality of cylinder bores that include a corresponding plurality of pistons disposed therein. The plurality of pistons are coupled to a crankshaft extending along a longitudinal axis extending from a front of the engine block to a back of the engine block. The crankshaft is rotationally coupled to a geartrain. The electric machine coupled to the engine block. The electric machine is configured to generate an electric current by induction via a prime mover causing a rotation in a rotor and a stator with respect to each other. The electric machine is coupled at least in part on a side of the engine block between the front of the engine block and the back of the engine block. The gearset includes an output gear coupled to the prime mover of the electric machine. The gearset further includes an input gear rotationally coupled to the crankshaft via a crankshaft gear. The input gear is also rotationally coupled to the output gear to actuate the output gear at a gear ratio greater than 1:1 for a given rotational speed of the crankshaft.

Yet another embodiment relates to a method of operating an electric machine assembly. The method includes actuating an internal combustion engine. The method further includes transmitting rotation from a crankshaft to a torque transmitter, the torque transmitter including a rotating input driver configured to receive torque transmitted from the crankshaft, the torque transmitter including a rotating output driver coupled to the rotating input driver, the rotating input driver coupled to the rotating output driver to actuate the rotating output driver at a plurality of gear ratios. The method includes generating electric current via an electric machine configured to generate the electric current by induction via a prime mover causing rotation of one of a rotor and a stator with respect to the other one of the rotor and the stator, the prime mover coupled to the rotating output driver to receive the torque transmitted from the crankshaft at a first gear ratio, whereby the prime mover rotates. The method further includes analyzing a change in an electrical power request. The method includes causing the torque transmitter to change from the first gear ratio to a second gear ratio in response to the change in the electrical power request.

Yet another embodiment relates to a method of operating an electric machine assembly. The method includes actuating an internal combustion engine via torque transmitted from an electric machine coupled to a crankshaft of the internal combustion engine via a torque transmitter engaged at a first gear ratio of the torque transmitter, the torque transmitter including a first rotating driver coupled to the crankshaft and a second rotating driver coupled to the first rotating driver and a prime mover of the electric machine, the torque from the electric machine generated via a stored power supply coupled to the electric machine. The method further includes causing the torque transmitter to change from the first gear ratio to a second gear ratio subsequent to actuation of the internal combustion engine, the first gear ratio being greater than the second gear ratio. The method includes causing a combustion process to occur in the internal combustion engine. The method further includes transmitting torque from the crankshaft to the torque transmitter to rotate the prime mover of the electric machine at the second gear ratio, the torque from the crankshaft generated via the combustion process in the internal combustion engine. The method includes generating electric current via the electric machine by rotation of the prime mover, the prime mover coupled to one of a rotor and a stator of the electric machine, the electric machine configured to generate electric current by induction via the prime mover causing rotation of one of the rotor and the stator with respect to the other one of the rotor and the stator.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive electric machine assemblies and methods of operating electric machine assemblies for internal combustion engines. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
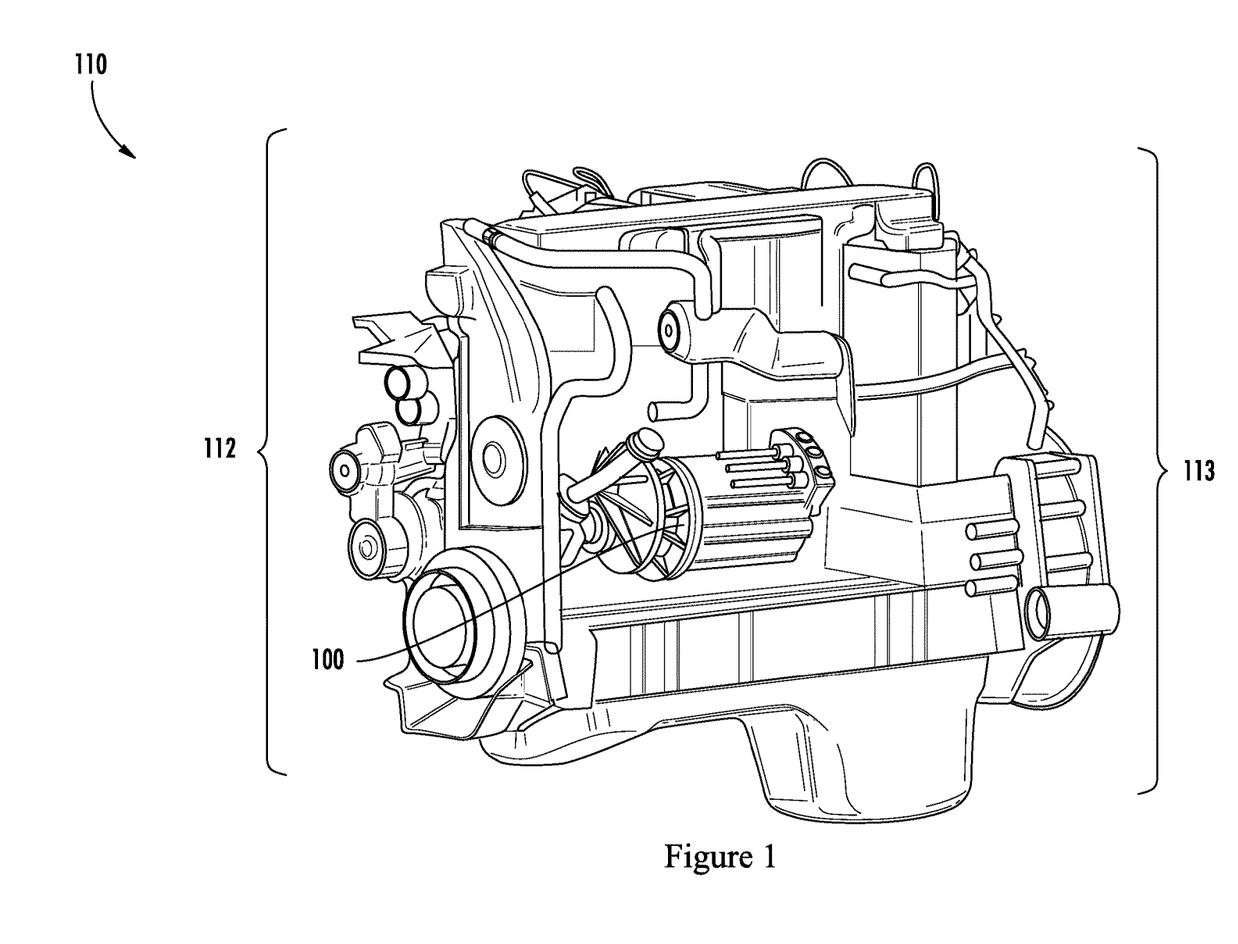
FIG. 1 shows a perspective view of an engine with an installed electric machine, according to an example embodiment.

Referring now to FIG. 1, an internal combustion engine 110 is configured to provide a mechanical force to enable one or several functionalities of an associated vehicle. The internal combustion engine 110 typically consumes combustible fuel (e.g., gasoline, diesel fuel, natural gas, and so on) during operation in order to provide an appropriate amount of mechanical force to suit a given vehicle's needs. However in some arrangements, the operation of the internal combustion engine 110 is assisted by an electric machine assembly 100.

The internal combustion engine 110 may be disposed in a longitudinal orientation within a vehicle, such that a front 112 of the internal combustion engine 110 is directed toward the vehicle's primary path travel (e.g., toward the tip of a hood in a front-engine passenger vehicle) and a corresponding back 113 is directed away from the vehicle's primary path of travel (e.g., toward a passenger cabin in a front-engine passenger vehicle). In some such arrangements, the electric machine assembly 100 may be disposed on a corresponding side portion of the internal combustion engine 110 (e.g., engaged to a lateral side between the front 112 and the back 113 of the internal combustion engine 110). As such, the electric machine assembly 100 may be incorporated into a given internal combustion engine 110 without meaningfully impacting the overall longitudinal length of the internal combustion engine 110 or length-dependent internal combustion engine 110 housing structures in a corresponding vehicle. Further, in accordance with example embodiments disclosed herein, the electric machine assembly 100 may be implemented with an internal combustion engine 110 configured with front geartrains as well with an internal combustion engines 110 configured with rear geartrains.

In one aspect, the electric machine assembly 100 may be configured to assist the operation of the internal combustion assembly 110. For example, the electric machine assembly 100 may include an energy storage device, which may provide an electrical current through the electric machine assembly to drive a starter (e.g., to start up the internal combustion engine 110) or an alternator (e.g., to drive accessory components). In another aspect, the electric machine assembly 100 may be configured to convert and store a mechanical force produced by the internal combustion assembly 110 as electrical energy. For example, the electric machine assembly 100 may include an induction-based electrical generator that is coupled to a rotational output provided by the internal combustion assembly 110. As such, in operation, the electric machine assembly 100 can receive a rotational output from the internal combustion assembly 110 to drive the induction generator, and store the resulting electrical energy in a battery. The features and functions of the internal combustion engine 110 and the electric machine assembly 100 are discussed in more detail below.

Figure 2:
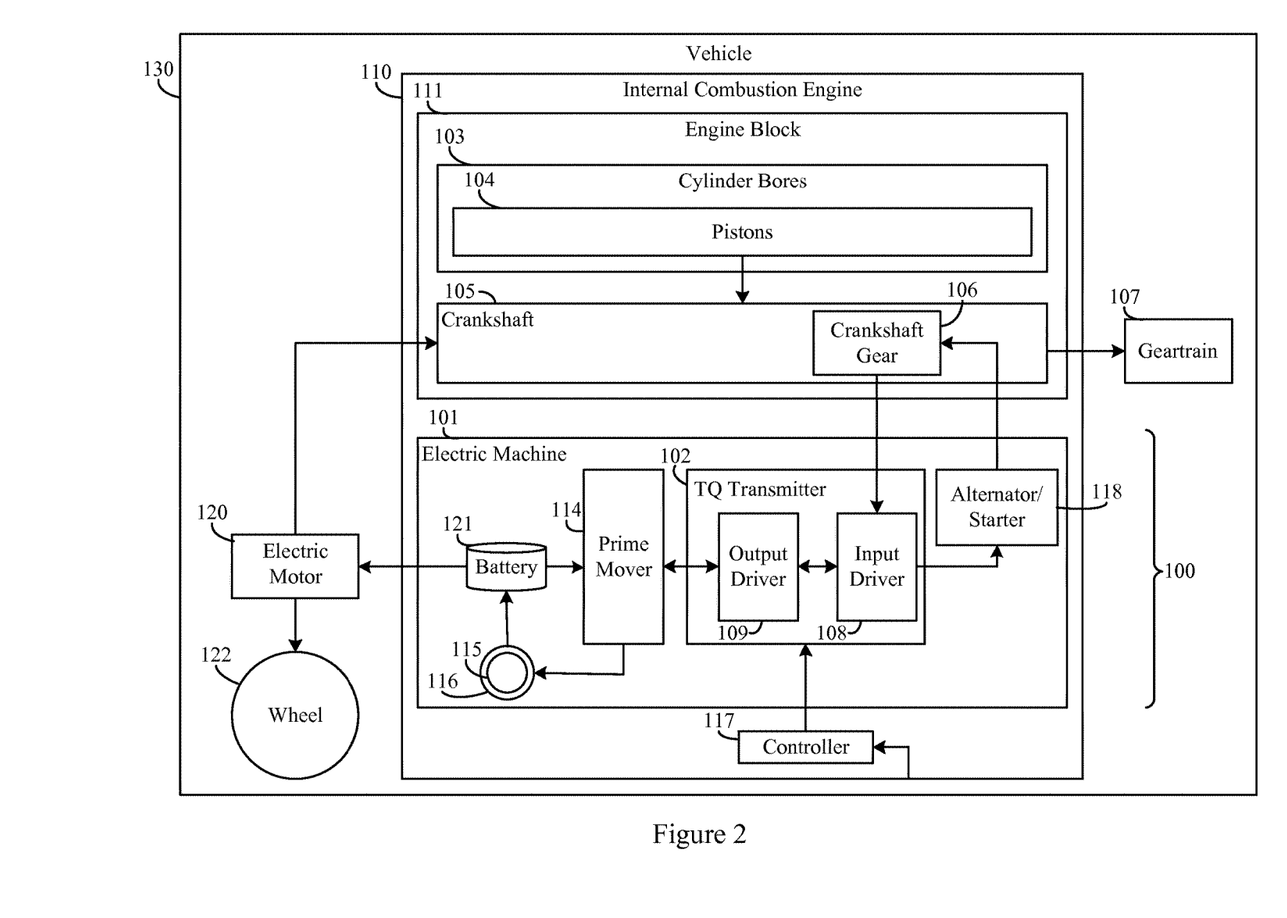
FIG. 2 is a schematic block diagram illustrating additional features of the engine shown in FIG. 1.

Referring to FIG. 2, the internal combustion engine 110 is disposed within a vehicle 130. The internal combustion engine 110 includes an engine block 111 coupled to an electric machine 101, and a controller 117. The controller 117 is a processor and non-transient computer-readable media that together provide a circuit configured to perform operations that include sending and receiving signals throughout the internal combustion engine 110. In some arrangements, the controller 117 is communicatively coupled to a plurality of sensors disposed throughout the vehicle 130 (e.g., oil pressure sensors, temperature sensors, electrical load sensors, and so on). Further, the controller 117 can be communicatively coupled to a plurality of mechanical devices that can be electrically actuated (e.g., gearsets, in the manner discussed in detail below).

The engine block 111 houses a plurality of cylinder bores 103, each of which is configured to contain a cyclical combustion process. Each of the plurality of cylinder bores 103 includes a piston 104 disposed therein that is coupled to a crankshaft 105. Each combustion cycle actuates the piston 104, which in turn actuates the crankshaft 105. The frequency of the combustion and actuation cycles, along with the rate at which the crankshaft rotates as a result of cycle gives rise to an internal combustion engine 110 rotational speed. The crankshaft 105 extends along a longitudinal axis of the engine block 111 (e.g., parallel to the longitudinal orientation of the internal combustion assembly 110, as discussed with respect to FIG. 1, above). The internal combustion engine 110 also includes a geartrain 107 coupled to the crankshaft 105, which may be used as a mechanical force output (e.g., to drive wheels or accessory devices associated with the vehicle 130). In accordance with particular embodiments, the electric machine assembly 100 is mounted to a side of the internal combustion engine 110 between the front of the engine block 112 and the back of the engine block 113. The electric machine assembly 100 may be mounted to the internal combustion engine 110 via a bracket. The engagement of the electric machine assembly 100 to a side of the internal combustion engine (e.g., lateral of the crankshaft 105) is advantageous at least in part because it does not add to the overall length of the internal combustion engine 110.

The electric machine assembly 100 includes an electric machine 101. The electric machine 101 includes a rotor 115 and a stator 116 that are configured to rotate with respect to one another to generate an electric current, which may be stored in a battery 121. At least one of the rotor 115 and the stator 116 are rotated with respect to one another via a prime mover 114. In various embodiments, the electric machine 101 further includes an alternator and a starter 118.

The electric machine 101 has a torque transmitter 102 coupled thereto. In some arrangements, the torque transmitter 102 includes a gearset. In some such arrangements, the torque transmitter 102 gearset includes a rotating input driver 108 and a rotating output driver 109. In one arrangement, the rotating input driver 108 is configured to receive a rotary input transmitted from the crankshaft 105. The crankshaft 105 may be coupled to the rotating input driver 108 at a crankshaft gear 106. The rotating input driver 108 is also coupled to the rotating output driver 109. In particular embodiments, the rotating input driver 108 includes a gearset having a fixed ratio, such as 4:1, and the output driver 109 includes a gearset configured to change from a first gear ratio to a second gear ratio, such as 3:1 and 1:1. In such an embodiment, the torque transmitter 102 is able to provide a gear ratio ranging from 4:1 to 12:1. In various embodiments, the torque transmitter 102 can include a planetary gearset, a compound gear, or a magnetic gearset.

In one arrangement, the rotating input driver 108 is coupled to and drives the rotating output driver 109, which in turn is coupled to and drives the prime mover 114. Accordingly, where the torque transmitter is able to provide a gear ratio ranging from 4:1 to 12:1, the prime mover 114 is driven at a gear ratio greater than 1:1 with respect to the rotational speed of the internal combustion engine 110. This drive modality enables a significant reduction in the scale of the electric machine 101, which may still provide a significant amount of power. In example embodiments, the rotating input driver 108 drives the rotating output driver 109 at a gear ratio of 3:1 with respect to the rotational speed of the internal combustion engine 110. In other embodiments, the rotating input driver 108 drives the rotating output driver 109 at a gear ratio of 4:1 with respect to the rotational speed of the internal combustion engine 110. In yet other embodiments, the rotating input driver 108 drives the rotating output driver 109 at a gear ratio of 5:1 with respect to the rotational speed of the internal combustion engine 110. The torque transmitter 102 may include a torsional damper, various shaft designs, and/or low-inertia machines to facilitate meeting specific engine durability requirements.

In example embodiments, the torque transmitter 102 may include a planetary gearset incorporating an overrunning clutch and a brake mechanism. The brake mechanism may be actuated by engine oil pressure. In turn, the oil pressure may be either controlled through a solenoid valve (e.g., as actuated by the controller 117), or passively as the engine oil pump builds pressure as the engine spins up during a start. In particular embodiments, the planetary gearset components could be exclusively controlled by oil pressure, for example, through a combination of passive and actively controlled clutches (although solely passive oil pressure based actuation may be implanted in accordance with example embodiments).

In particular embodiments, the electric machine assembly 100 may be implemented for power generation to supply power directly or from the battery 121 to various auxiliary components coupled to the vehicle 130. For example, the electric machine assembly 100 may be implemented for starting the internal combustion engine 110 or for hybridization of the vehicle 130. For example, the electric machine assembly 100 may be used to charge the battery 121, which in turn may be used to power an electric motor 120 coupled to a drivetrain of a vehicle or coupled to one or more wheels 122. The electric motor 120 may be engaged, for example, during cruising operations of the vehicle 130. In another example, the battery 121 may be used to drive an alternator or a starter.

In example embodiments, the rotating input driver 108 drives the rotating output driver 109 at a plurality of gear ratios with respect to the rotational speed of the internal combustion engine 110. The plurality of gear ratios includes, but is not limited to, two gear ratios and continuously variable gear ratios. A two-speed gear mechanism allows for a high numerical gear ratio between the internal combustion engine 110 and the electric machine assembly 100 when torque multiplication is desired (e.g., for driving an engine starter), while also permitting a lower gear ratio (e.g., when the electric machine 101 is generating and storing power in the battery 121).

Example embodiments provide two unique gear ratios between the engine and a starter/alternator 118 by varying the gear ratio of the torque transmitter 102. In particular embodiments, the gear ratios are changed by controlling the elements of a planetary gearset. In accordance with example embodiments, the variation in gear ratio is applied to the electric machine 101 in order to provide a numerically high ratio to generate a mechanical force (e.g., for starting the internal combustion engine 110), and a numerically lower ratio to drive the electric machine 101 as an alternator (e.g., to provide electrical power or to store electrical power in the battery). In some arrangements, the gear ratio selection may be actuated via engine oil pressure (e.g., either passively or actively controlled). In other arrangements, the gear ratio selection may be actuated via the controller 117. Being able to provide this gear ratio spread allows improved performance and functionality while reducing the requirements on the electric machine assembly 100. The reduced requirements (e.g., lower maximum speed and lower maximum torque) may greatly reduce the cost of the electric machine assembly 100.

A particular embodiment of the electric machine assembly 100 includes a planetary gearset as the torque transmitter 102. The planetary gearset includes a sun gear directly coupled to the starter/alternator 118, the planet carrier coupled to the crankshaft 108 through the crankshaft gear 106, and an optionally stationary ring gear. This embodiment of the electric machine assembly 100 also includes a brake mechanism that holds the ring gear of the planetary gearset stationary in order to effect a numerically high gear ratio through the gearset. This brake mechanism is spring loaded to lock the ring gear when there is no engine oil pressure (i.e., the brake or clutch is normally closed). Engine oil pressure of a given level will disengage the ring gear brake. An overrunning clutch included between the sun gear shaft and the planet gear carrier shaft locks up if the planet carrier shaft spins faster than the sun gear shaft, creating a 1:1 ratio across the gearset. In this configuration, the system may operate under the following modes:

A) With the internal combustion engine 110 off and no engine oil pressure present, the ring gear is locked to ground via spring pressure.
B) The electric machine 101 applies torque to the sun gear shaft (e.g., electrical power from the battery 121 causes a transfer of rotational torque from the prime mover 114 to the alternator/starter 118), and a numerically high gear ratio is achieved between the sun gear shaft and the planet gear carrier shaft, which is connected to the internal combustion engine 110 (e.g., via the crankshaft gear 106).

C) Once engine oil pressure reaches a designated level, the oil pressure overcomes the spring force and the ring gear brake is released and the ring gear allowed to rotate freely. When power to the electric machine 101 is removed and the running internal combustion engine 110 overtakes the alternator/starter 118 speed, the overrunning clutch locks the sun gear shaft and the planet carrier shaft together. Since the ring gear is now free to rotate, the entire gearset rotates as one, resulting in a direct drive ratio (i.e., 1:1) across the gearset.

D) As the internal combustion engine 110 operates in its normal rotational speed range, the electric machine 101 is driven at a numerically lower gear ratio, more appropriate for electricity generation and storage.

E) As the engine shuts down, oil pressure is largely maintained until the internal combustion engine 110 reaches very low speeds, keeping the electric machine 101 in the numerically lower gear ratio. The electric machine 101 thereby absorbs power (e.g., translating rotational torque into electrical power by driving the prime mover 114), quickly slowing the internal combustion engine 110.

F) When the oil pressure reaches a designated value, the electric machine 101 ring gear brake will reengage, at which point the electric machine 101 is ready for the next restart.

Other embodiments of the electric machine 101 may include a different default position or gear ratio under low engine oil conditions (resulting in different failure modes and energy consumption).

Figure 3:
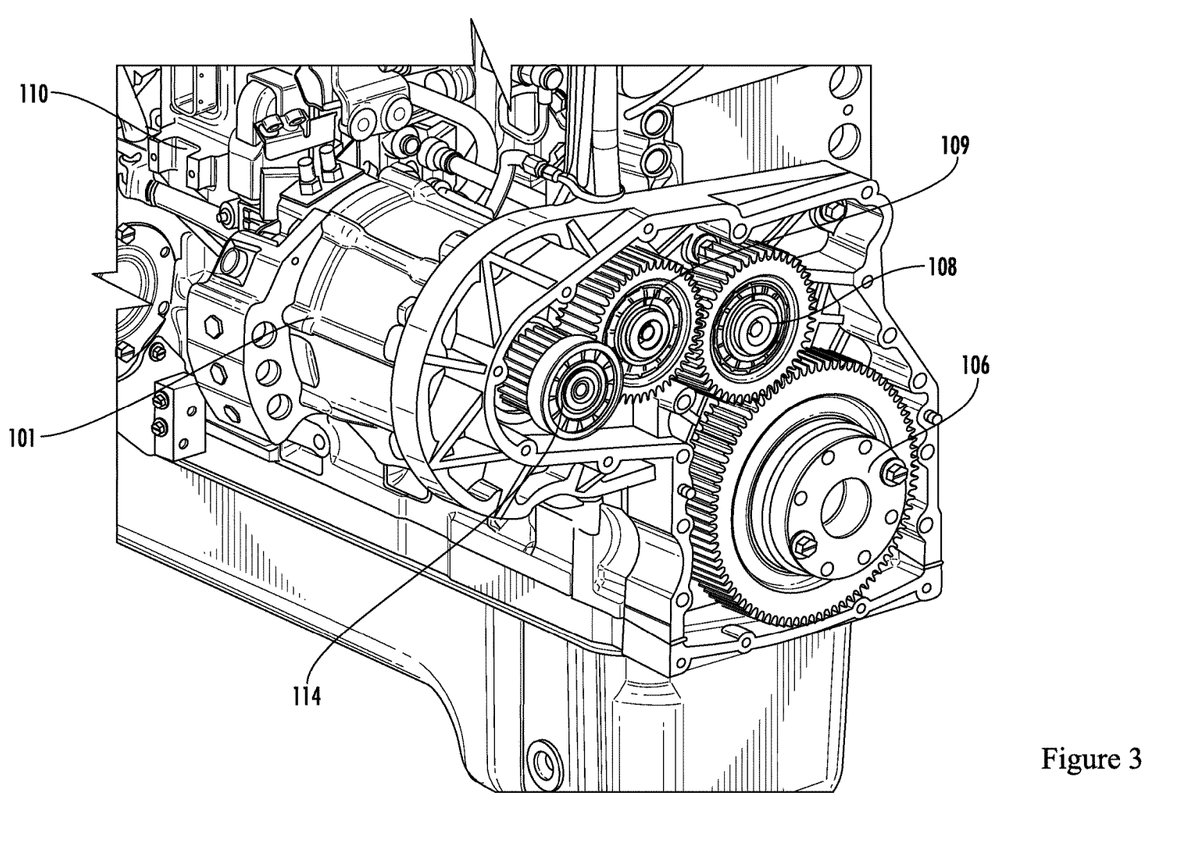
FIG. 3 illustrates a torque transmitter engaged to an electric machine and an engine, according to an example embodiment.

FIG. 3 illustrates an example arrangement of the torque transmitter 102 as operatively engaged to the internal combustion engine 110 and the electric machine 101. The crankshaft of the internal combustion engine 110 is rotatably engaged to the crankshaft gear 106, which is shown operatively engaged to the input driver 108. The input driver 108 is operatively engaged to both the crankshaft gear 106 and the prime mover 114. As such, in one aspect, the crankshaft gear 106 can transmit a rotational torque across the input driver 108 and the output driver 109, ultimately causing the prime mover to rotate 114 and generate electrical power in the electric machine 101 (e.g., for storage or immediate use). In another aspect, an energy storage device (e.g., the battery 121) can cause the prime mover 114 transmit a rotational torque across the output driver 109 and the input driver 108, thereby causing the crankshaft gear 106 to rotate (e.g., where the electric machine 101 is serving as an engine starter).

Figure 4:
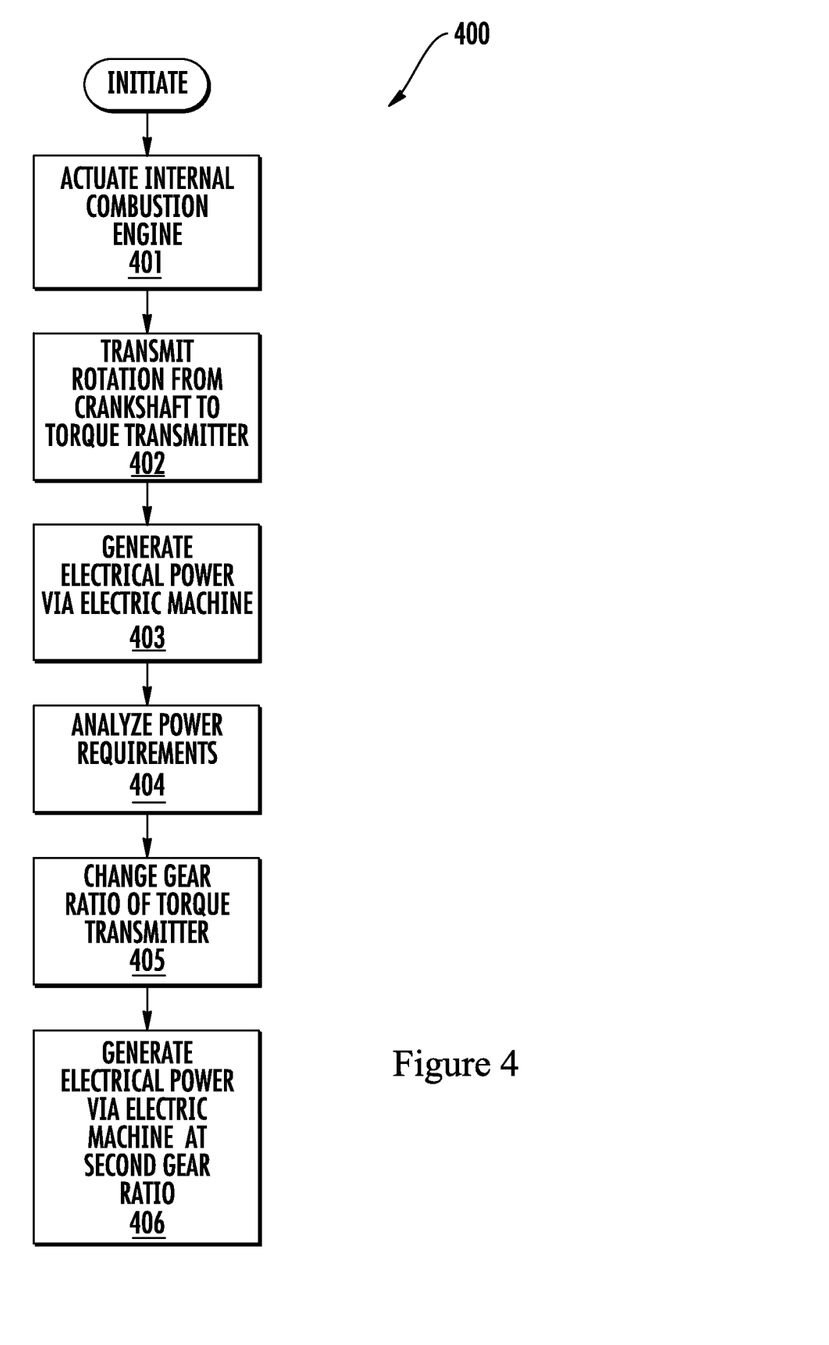
FIG. 4 illustrates a flow diagram showing a method of operating an electric machine, according to an example embodiment.

FIG. 4 illustrates a flow diagram showing a method of operating an electric machine in accordance with example embodiments. The process 400 may be controlled by one or more engine controllers (e.g., controller 117) in accordance with example embodiments. In a first process 401, the internal combustion engine (e.g., internal combustion engine 110) is actuated. The actuation transmits, in process 402, rotation from a crankshaft (e.g., crankshaft 105) to a torque transmitter (e.g., torque transmitter 102). The torque transmitter causes, in process 403, generation of electric current via an electric machine (e.g., electric machine 101). The torque transmitter causes generation of electric current by rotating an input driver (e.g., input driver 108) that is coupled to the crankshaft (directly or indirectly), thereby rotating an associated output driver (e.g., output driver 109) at a plurality of gear ratios. Rotation of the output driver rotates a prime mover (e.g., prime mover 114) of the electric machine, which generates the electric current by induction when the prime mover causing rotation of one of a rotor (e.g., rotor 115) and a stator (e.g., stator 116) with respect to the other one of the rotor and the stator. In process 404, a controller (e.g., controller 117) analyzes a power requirement, for example based on a request for an increase or reduction in electrical (or mechanical power in an electric hybrid) power. The controller causes the gear ratio of the torque transmitter to change, up or down, based on the analysis of the power requirement in process 405. Power is generated by the electric machine at the new gear ratio in process 406.

Figure 5:
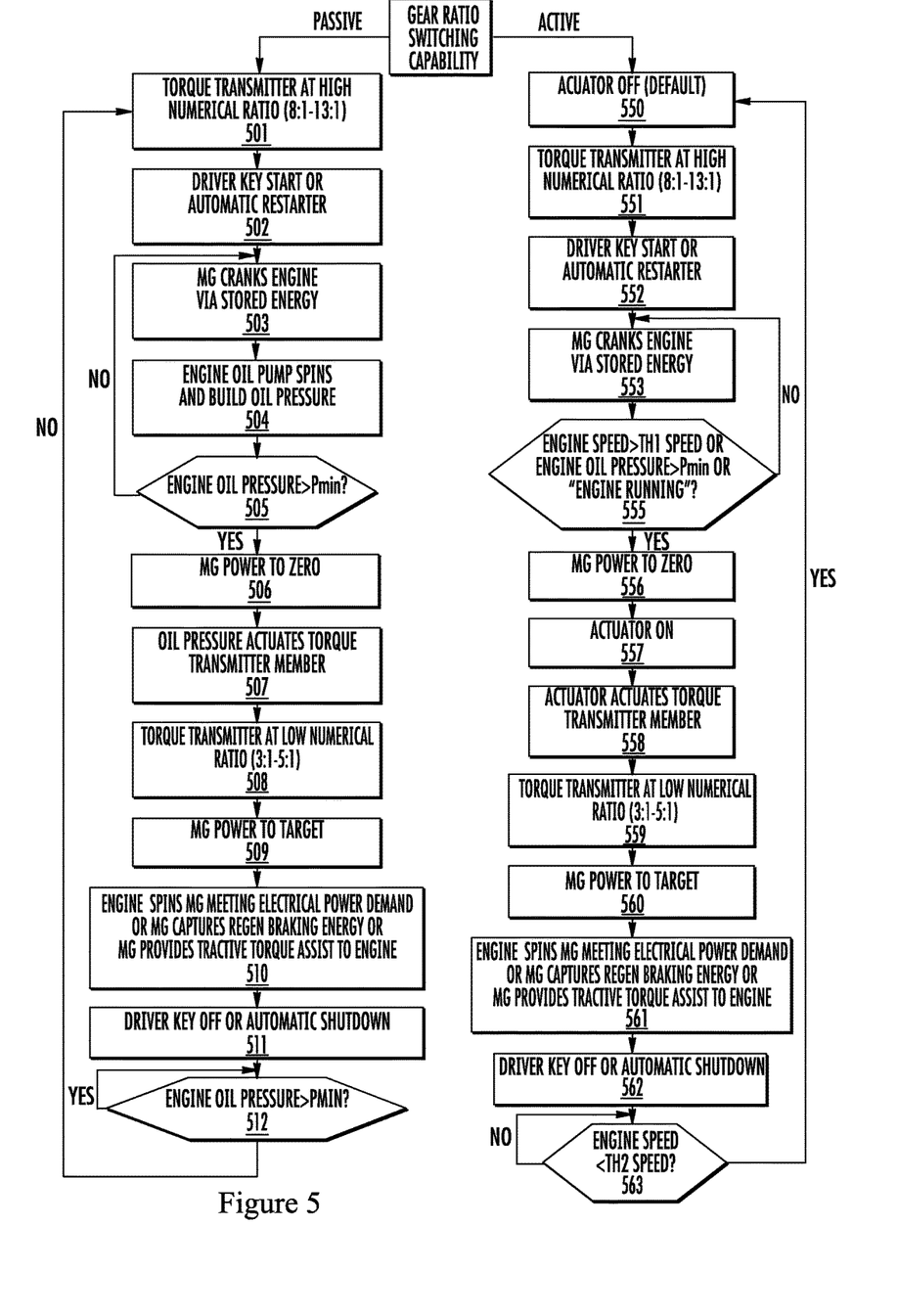
FIG. 5 illustrates a flow diagram showing a method of operating an electric machine, according to another example embodiment.

FIG. 5 illustrates a flow diagram showing a method of operating an electric machine in accordance with example embodiments. In particular embodiments, an electric machine (e.g., electric machine 101) may be a motor-generator (MG) operating as a motor providing mechanical power in some instances and switching to operate as a generator providing electrical power. FIG. 5 illustrates passive and active modes of gear switching by a torque transmitter in connection with the electric machine operating as an MG, in accordance with particular embodiments.

In passive gear ratio switching embodiment, a torque transmitter (e.g., torque transmitter 102) according to particular embodiments begins in process 501 at a first gear ratio that is a high gear ratio with respect to a second gear ratio. In particular embodiments, the first gear ratio may include a gear ratio in the range of 8:1 to 13:1. In process 502, a driver initiates an engine start/restart of an internal combustion engine (e.g., internal combustion engine 110) of a vehicle (e.g., vehicle 130) the driver is operating. The start/restart may include an initial keyed start, or it may include a start initiated by operating the accelerator, for example for a vehicle configured to shut down when the vehicle is at rest, such as at a stop light.

In response to the request for a start or restart in process 502, the electric machine operating as an MG is used to crank the internal combustion engine in process 503. The MG is coupled to the internal combustion engine via a prime mover (e.g., prime mover 114) coupled to a crankshaft (e.g., crankshaft 105) of the engine via the torque transmitter, which is engaged at the first high gear ratio in process 503. The MG is rotated to actuate the internal combustion engine via a stored energy supply (e.g., battery 121) coupled to the MG. In process 504, an engine oil pump is actuated in connection with the engine being actuated and the oil pressure in the engine oil pump increases. In particular embodiments, the MG may cease supplying cranking power to the internal combustion engine in process 506 based on a pressure reading of the engine oil pressure of the engine oil pump determined in analysis 505 (e.g., as performed by the controller 117). Once the oil pressure has reached a particular threshold, the MG terminates the mechanical cranking of the crankshaft in process 506. If the oil pressure has not reached a predetermined threshold, the MG may continue supplying mechanical power to crank the engine crankshaft.

In process 507, the oil pressure from the oil pump is transmitted to the torque transmitter. In process 508, the oil pressure from the oil pump passively (i.e. without a controller directly actuated the change) causes the torque transmitter to change from the first gear ratio to at least one second lower gear ratio, such as a gear ratio in the range of 3:1 to 5:1. In process 509, the MG inductively generates electric power for transmission to one or more particular targets on the vehicle, such as electrically operated auxiliary components of the vehicle. In particular embodiments, the MG may be actuated, as demonstrated in process 510, to provide a required electrical demand (which may require a further change in the gear ratio of the torque transmitter based on the quantity of the electrical demand) to regenerative energy capture from engine braking, or to provide tractive torque assistance to the engine. In process 511, the engine may be shut down via a keyed command from the driver or automatically, pursuant to a fuel conserving start/stop shut down command initiating in response to certain vehicle and/or engine conditions. As a result of the shutdown, the engine oil pressure will drop. Pursuant to analysis 512, if the oil pressure drops below the predetermined threshold, the torque transmitter may be configured, for example, via a spring biased component, to automatically switch back to the higher gear ratio.

In particular embodiments, the gear ratio switching of the torque transmitter of the electric machine assembly may be actively controlled (e.g., by the controller 117), instead of passively controlled via engine oil pressure. In particular embodiments where the electric machine assembly is actively controlled for gear ratio switching of the torque transmitter of the electric machine assembly, the controller may be configured to cause the actuator that causes the torque transmitter to change from a high gear ratio to a low gear ratio to be turned off. The actuator may be turned off in particular embodiments by disconnecting a power supply to the actuator. The torque transmitter may be configured, in process 551, to engage a first gear ratio that is high with respect to a second gear ratio when the controller disables actuation of the engine by the motor generator in process 550.

In process 552, a driver initiates an engine start/restart of an internal combustion engine of a vehicle the driver is operating. The start/restart may include an initial keyed start or it may include a start initiated by operating the accelerator, for example for a vehicle configured to shut down when the vehicle is at rest, such as at a stop light. In response to the request for a start or restart in process 552, the electric machine operating as an MG is used to crank the internal combustion engine in process 553. The MG is coupled to the internal combustion engine via a prime mover of the MG coupled to a crankshaft of the engine via the torque transmitter, which is engaged at the first high gear ratio in process 553. Using a stored energy supply coupled to the MG, the MG causes a rotation in the prime mover, thereby actuating the internal combustion engine.

The controller analyzes, in process 555, one or more of engine speed, engine oil pressure, or a condition, such as temperature of a combustion chamber to determine if the engine is running If one or more of these conditions indicates that the engine is running and producing power via combustion, the MG ceases supplying cranking power to the internal combustion engine in process 556. If one or more of these conditions indicates the engine is not yet producing power via combustion, the MG may continue cranking or actuating the engine. Once the motor is generating mechanical power via combustion, the actuator is switched on in process 557. The actuator actuates the torque transmitter in process 559 and causes the torque transmitter to switch from the first high gear ratio to at least one second lower gear ration in process 559.

In process 560, the MG inductively generates electric power for transmission to one or more particular targets on the vehicle, such as electrically operated auxiliary components of the vehicle. In particular embodiments, the MG may be actuated, as demonstrated in process 561, to provide a required electrical demand (which may require a further change in the gear ratio of the torque transmitter based on the quantity of the electrical demand) to regeneratively capture energy from engine braking, or to provide tractive torque assistance to the engine. In process 562, the engine is shut down via a keyed command from the driver or automatically, pursuant to a fuel conserving start/stop shut down command initiating in response to certain vehicle and/or engine conditions. As a result of the shutdown, the engine speed will drop. Pursuant to analysis 563, if the engine speed drops below the predetermined threshold, the actuator that switches the torque transmitter from a high gear ratio to a low gear ratio is disabled or turned off, causing the torque transmitter to return back to the higher gear ratio.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An electric machine assembly, comprising:
an electric machine configured to generate electric current by induction via a prime mover causing rotation of one of a rotor and a stator with respect to the other one of the rotor and the stator; and
a torque transmitter including a rotating output driver coupled to the prime mover of the electric machine, the torque transmitter including a rotating input driver configured to receive a rotary input transmitted from a crankshaft of an internal combustion engine, the rotating input driver coupled to the rotating output driver to actuate the rotating output driver at a plurality of gear ratios,
wherein the torque transmitter is changed from a first gear ratio of the plurality of gear ratios to a second gear ratio of the plurality of gear ratios via a change in engine oil pressure.

2. The electric machine assembly of claim 1, wherein the torque transmitter includes a gearset.

3. The electric machine assembly of claim 2, wherein the gearset includes a compound gear.

4. The electric machine assembly of claim 2, wherein the gearset includes one of a planetary gearset, and a magnetic gearset.

5. The electric machine assembly of claim 1, wherein the torque transmitter includes a chain drive.

6. The electric machine assembly of claim 1, wherein the torque transmitter includes a continuously variable transmission.

7. The electric machine assembly of claim 1, further comprising a controller electrically coupled to the torque transmitter to cause a change from the first gear ratio to the second gear ratio.

8. The electric machine assembly of claim 7, wherein the controller causes the torque transmitter to change from the first gear ratio to the second gear ratio in response to a change in operation of the internal combustion engine.

9. The electric machine assembly of claim 7, wherein the controller causes the torque transmitter to change from the first gear ratio to the second gear ratio in response to a change in a request for electrical power from the electric machine.

10. The electric machine assembly of claim 7, wherein the controller causes the torque transmitter to change from the first gear ratio to the second gear ratio via the change in engine oil pressure.

11. The electric machine assembly of claim 7, wherein the first gear ratio is higher than the second gear ratio.

12. The electric machine assembly of claim 7, wherein the first gear ratio is in a range of 8:1 to 13:1 and wherein the second gear ratio is in a range of 3:1 to 5:1.

13. The electric machine assembly of claim 1, wherein a rotational speed and torque of the rotating output driver are at a gear ratio greater than 1:1 with respect to a rotational speed and torque of the internal combustion engine.

14. The electric machine assembly of claim 13, wherein the plurality of gear ratios include one of a gear ratio of 3:1, 4:1, and 5:1.

15. The electric machine assembly of claim 13, wherein the plurality of gear ratios includes a gear ratio in a range of 8:1-13:1.

16. The electric machine assembly of claim 1, wherein the electric machine includes one of an alternator and a starter.

17. A method of operating an electric machine assembly, the method comprising:
   actuating an internal combustion engine;
   transmitting rotation from a crankshaft to a torque transmitter, the torque transmitter including a rotating input driver configured to receive torque transmitted from the crankshaft, the torque transmitter including a rotating output driver coupled to the rotating input driver, the rotating input driver coupled to the rotating output driver to actuate the rotating output driver at a plurality of gear ratios;
   generating electric current via an electric machine configured to generate the electric current by induction via a prime mover causing rotation of one of a rotor and a stator with respect to the other one of the rotor and the stator, the prime mover coupled to the rotating output driver to receive the torque transmitted from the crankshaft at a first gear ratio, whereby the prime mover rotates;
   analyzing a change in an electrical power request; and
   causing the torque transmitter to change from the first gear ratio to a second gear ratio in response to the change in the electrical power request via a change in engine oil pressure.

18. The method of claim 17, wherein the torque transmitter includes a gearset.

19. The method of claim 17, wherein the first gear ratio and the second gear ratio are greater than 1:1 for a given rotational speed of the internal combustion engine.

20. A method of operating an electric machine assembly, the method comprising:
   actuating an internal combustion engine via torque transmitted from an electric machine coupled to a crankshaft of the internal combustion engine via a torque transmitter engaged at a first gear ratio of the torque transmitter, the torque transmitter including a first rotating driver coupled to the crankshaft and a second rotating driver coupled to the first rotating driver and a prime mover of the electric machine, the torque from the electric machine generated via a stored power supply coupled to the electric machine,
   causing the torque transmitter to change from the first gear ratio to a second gear ratio subsequent to actuation of the internal combustion engine via a change in engine oil pressure, the first gear ratio being greater than the second gear ratio;
   causing a combustion process to occur in the internal combustion engine;
   transmitting torque from the crankshaft to the torque transmitter to rotate the prime mover of the electric machine at the second gear ratio, the torque from the crankshaft generated via the combustion process in the internal combustion engine; and
   generating electric current via the electric machine by rotation of the prime mover, the prime mover coupled to one of a rotor and a stator of the electric machine, the electric machine configured to generate electric current by induction via the prime mover causing rotation of one of the rotor and the stator with respect to the other one of the rotor and the stator.

21. The method of claim 20, wherein the first gear ratio is in a range of 8:1 to 13:1 and wherein the second gear ratio is in a range of 3:1 to 5:1.

* * * * *